(12) United States Patent
Ando

(10) Patent No.: US 7,256,903 B2
(45) Date of Patent: Aug. 14, 2007

(54) IMAGE FORMING APPARATUS

(75) Inventor: Hironori Ando, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 963 days.

(21) Appl. No.: 10/370,978

(22) Filed: Feb. 20, 2003

(65) Prior Publication Data
US 2003/0169443 A1 Sep. 11, 2003

(30) Foreign Application Priority Data
Mar. 5, 2002 (JP) ............................. 2002-058336

(51) Int. Cl.
*G06K 15/00* (2006.01)
*G06F 3/12* (2006.01)
(52) U.S. Cl. ..................................... 358/1.14; 358/1.15
(58) Field of Classification Search ............... 358/1.14, 358/1.15, 1.1, 1.9, 1.13, 1.6, 403, 400, 401, 358/437; 710/8, 9, 11, 19, 31, 46; 709/223, 709/224
See application file for complete search history.

(56) References Cited

U.S. PATENT DOCUMENTS 5,299,026 A    3/1994  Vincett et al.
6,185,321 B1   2/2001  Fukushima et al.
6,565,607 B1 * 5/2003  Cox ............................. 715/500
6,934,509 B1   8/2005  Shimazu
6,970,263 B2 * 11/2005 Suzuki et al. ............... 358/1.15

FOREIGN PATENT DOCUMENTS

| JP | 5-236175    | 9/1993 |
| JP | 7-110645    | 4/1995 |
| JP | 9-26329     | 1/1997 |
| JP | 10-028218   | 1/1998 |
| JP | 10-210303   | 8/1998 |
| JP | 2000-032253 | 1/2000 |
| JP | 2001-127721 | 5/2001 |

\* cited by examiner

*Primary Examiner*—Douglas Q. Tran
(74) *Attorney, Agent, or Firm*—Jordan and Hamburg LLP

(57) ABSTRACT

An image forming apparatus includes restriction process executing unit for executing a predetermined restriction process in compliance with acquired restriction information; current position acquiring unit for acquiring current location information indicating a current location of the apparatus; restriction contents acquiring unit for acquiring restriction contents which differ depending on a region; and process contents updating unit for acquiring the restriction contents at the current location of the apparatus by the restriction contents acquiring unit based on the current location information acquired by the current position acquiring unit and for updating the restriction information in the image forming apparatus.

7 Claims, 6 Drawing Sheets

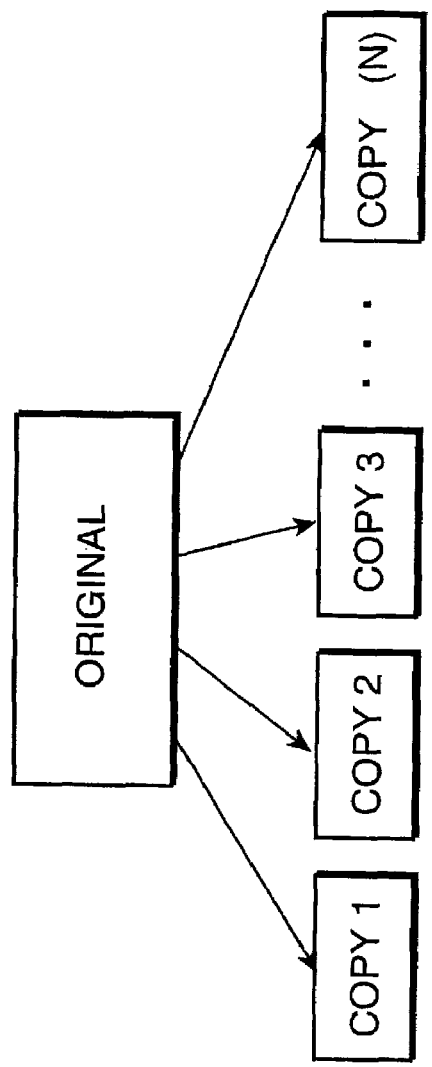
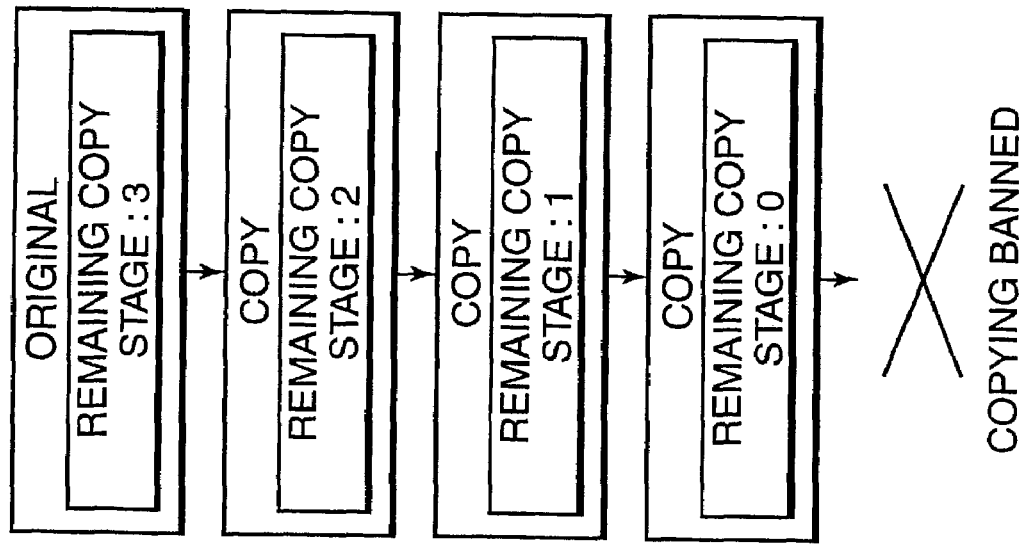

IMAGE FORMING APPARATUS

BACKGROUND OF THE INVENTION

1. Field of the Invention

This invention relates to image forming apparatus such as copiers, facsimile machines, and printers, and particularly pertains to an image forming apparatus that enables to carry out proper management regarding copyright and the like by supporting an operator in complying with restricting information such as information regarding copyright which differs from region to region.

2. Description of the Background Art

Japanese Unexamined Patent Publication No. 2000-187419 discloses a copier provided with copy restriction processing means of banning or restricting an operator from copying particular documents such as banknotes. According to the technology disclosed in the publication, when a person manipulates the copier to read an image on a particular document such as a banknote, the copier is operated to ban the person from performing illegal copying by comparing the read image with image data stored in storage means, and by storing peculiar information such as information on fingerprints of the person who has attempted to copy the particular document when it is judged that the read image is an image of a banknote.

In the above technology, prior to copying, an image to be copied is read, and the read image is compared with a pre-stored image. This is a convenient method as far as the image to be copied is a particular or discriminative image such as a banknote. However, it is difficult to pre-store all the images available in the world. It should be concluded that the above method is applicable merely to a particular or discriminative image such as a banknote.

Restriction information such as copy-related restriction information of banning copying of a particular image such as a banknote differs from region to region where laws and charging regulations differ. The conventional image forming apparatus has been designed merely to cope with restriction contents that have been defined at an early stage of establishing laws and regulations. Accordingly, if the conventional image forming apparatus is exported abroad, it is required to pre-store in the storage means of the apparatus the restriction contents in compliance with the laws and regulations in the country where the apparatus is to be exported. In case that the law constituting the restriction contents is revised during use of the apparatus, it is required to replace the storage means storing the old data with storage means storing data on the revised law every time the law is revised.

It should be noted that printers, facsimiles, and other image forming apparatus encounter the aforementioned problem as well as the copiers.

SUMMARY OF THE INVENTION

In view of the above problems residing in the prior art, an object of this invention is to provide an image forming apparatus that enables to ban illegal copying of documents including general documents and/or to perform charging with respect to copying of such documents.

According to an aspect of this invention, provided is an image forming apparatus comprising: restriction process executing means for executing a predetermined restriction process in compliance with acquired restriction information; current position acquiring means for acquiring current position information indicating a current location of the apparatus; restriction contents acquiring means for acquiring restriction contents which differ depending on a region; and process contents updating means for acquiring the restriction contents at the current location of the apparatus by the restriction contents acquiring means based on the current position information acquired by the current position acquiring means and for updating the restriction information in the image forming apparatus.

These and other objects, features and advantages of the present invention will become more apparent upon reading the following detailed description along with the accompanying drawings.

BRIEF DESCRIPTION OF THE DRAWINGS

FIGS. 6A and 6B are diagrams illustrating manners of restricting the number of copying.

DESCRIPTION OF THE PREFERRED EMBODIMENTS

Figure 1:
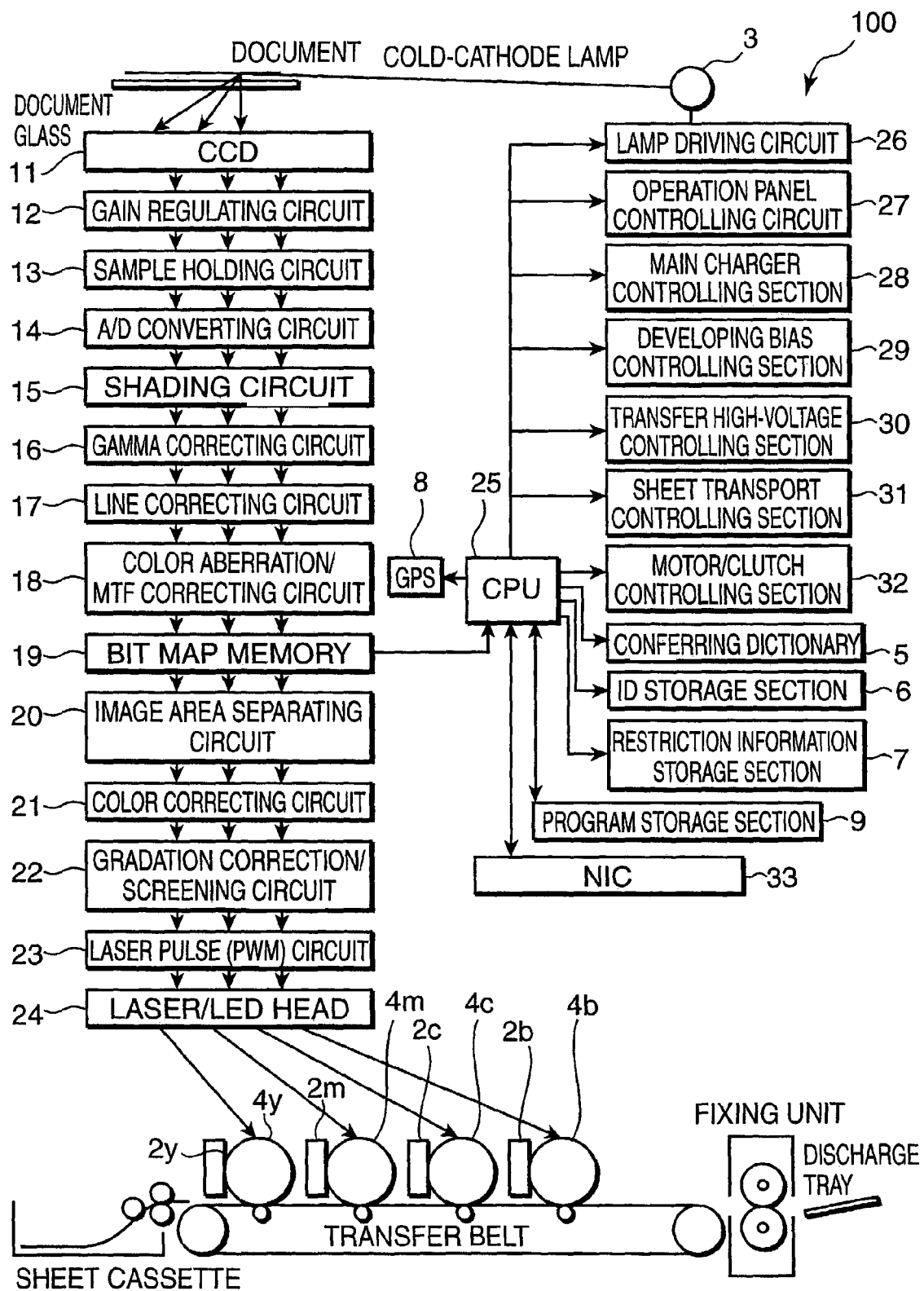
FIG. 1 is a conceptual diagram of an entirety of a copier in accordance with an embodiment of this invention.
Figure 2:
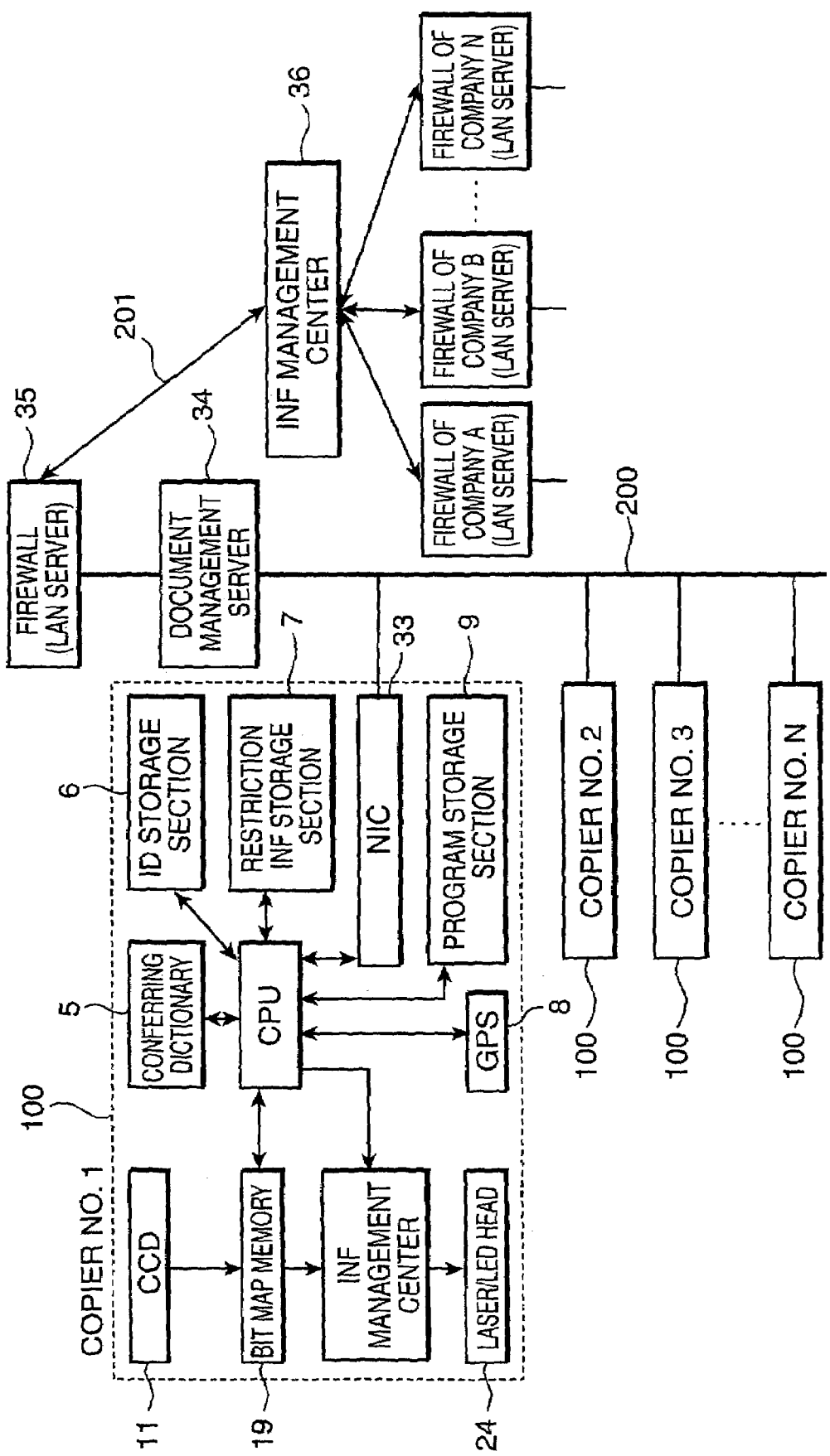
FIG. 2 is a diagram showing how the inventive copier is connected with a network system.
Figure 3:
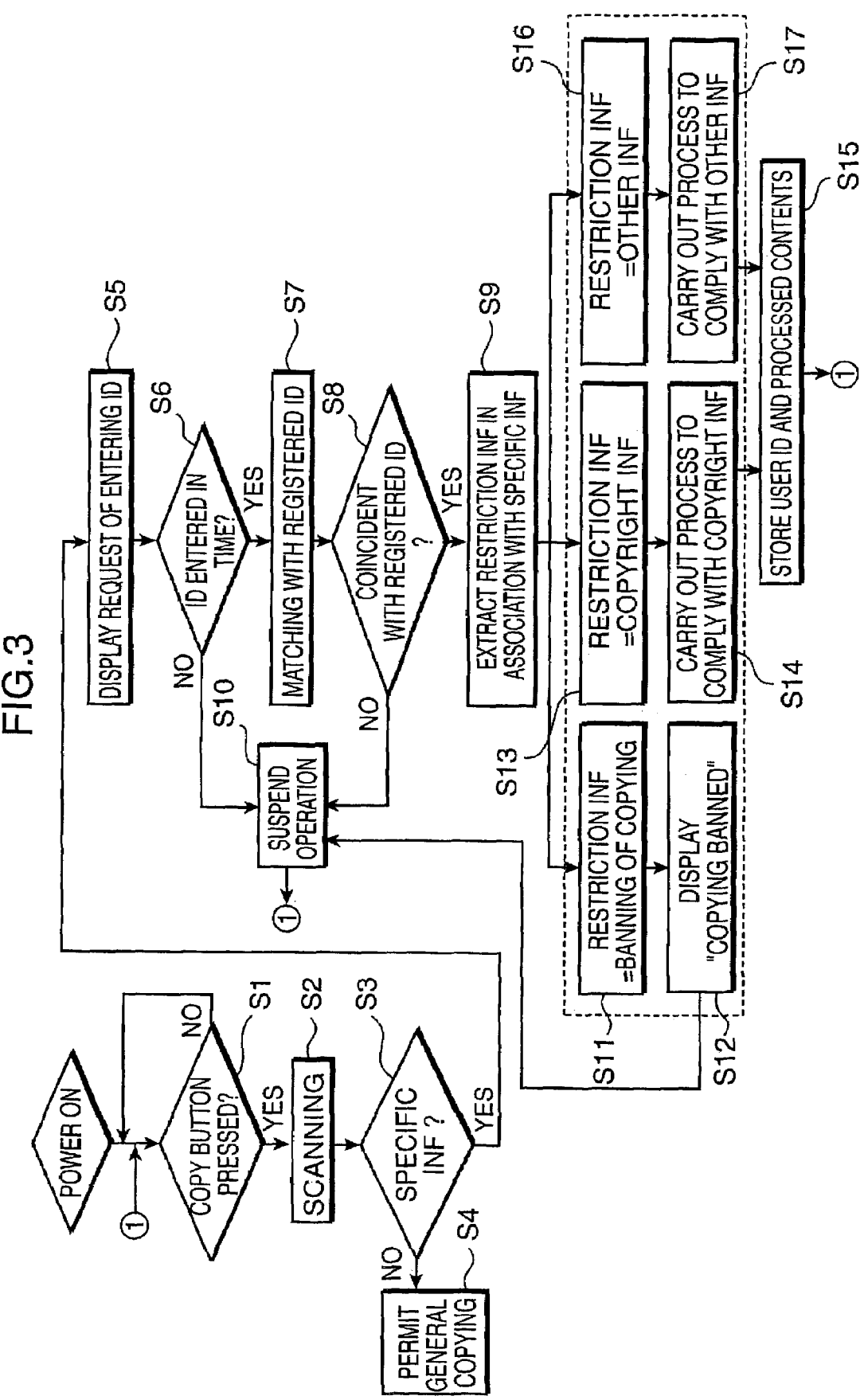
FIG. 3 is a flowchart showing an operation of an image processing in the inventive copier.
Figure 4:
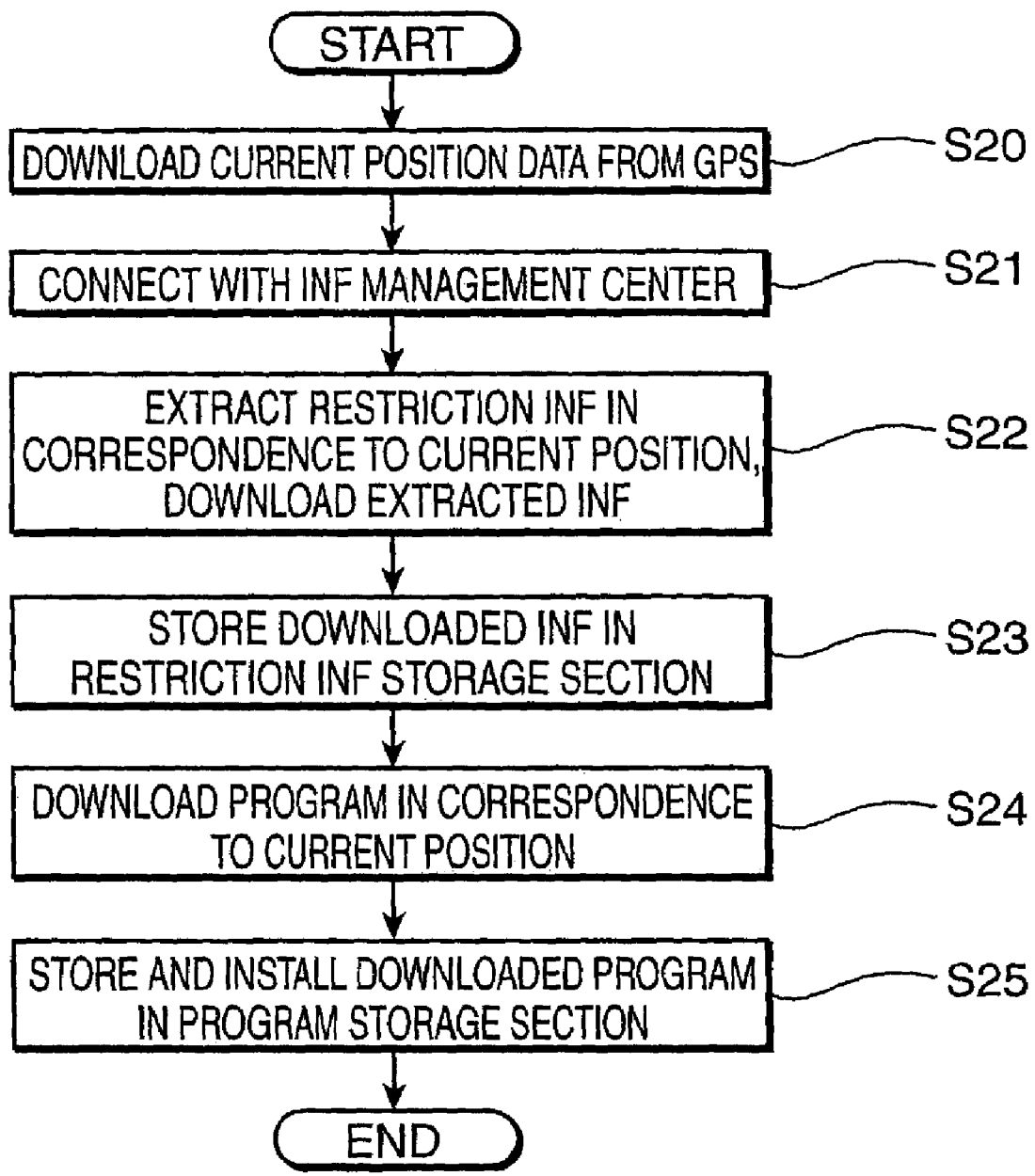
FIG. 4 is a flowchart showing an operation of restriction information acquiring means in the embodiment of this invention.

Next, embodiments of this invention are described with reference to the accompanying drawings to provide understanding of this invention. FIG. 1 is a conceptual diagram of an entire arrangement of a copier 100 in accordance with a first embodiment of this invention. FIG. 2 is a conceptual diagram showing a configuration of a network 200 connected with the copier 100. FIG. 3 is a flowchart illustrating an operation of the copier 100. FIG. 4 is a flowchart illustrating a sequence of operations for enabling a predetermined process in response to change of the current location of the copier 100.

As an example of the first embodiment of this invention, described is a copier for performing various processes based on visible information such as printed characters, patterns, and barcodes in yellow.

As shown in FIG. 1, the copier 100 has a function of color copying, and is provided with a yellow developing section 2$y$ for developing an image in yellow, a magenta developing section 2$m$ for developing an image in magenta, a cyan developing section 2$c$ for developing an image in cyan, and a black developing section 2$b$ for developing a monochromatic image.

First, a general copying operation by the copier 100, which is the same as a copying operation by a conventional copier, is described. A document placed on a document glass 1 is scanned by a cold-cathode lamp 3 such as a fluorescent lamp. A light image of the document (reflected light) obtained by the scanning is read by a known Charge Coupled Device (CCD) 11 or its equivalent. The read document image data is stored in a bit map memory 19 comprised of an Random Access Memory (RAM), a flash memory, and a Hard Disk Drive (HDD), via a known gain regulating circuit 12, a sample holding circuit 13, an A/D converting circuit 14, a shading circuit 15, a gamma correcting circuit 16, a line correcting circuit 17, and a color aberration/MFT correcting circuit 18.

The data stored in the bit map memory 19 is subjected to color conversion with respect to yellow, magenta, cyan/black generation via an image area separating circuit 20 and a color correcting circuit 21, and then is outputted as image data via a gradation correction/screening circuit 22 to drive a laser/LED head 24. Upon receiving the image data, the laser/LED head 24 is driven by a laser pulse circuit 23, and electrostatic latent images are formed on the surfaces of photosensitive members 4*y*, 4*m*, 4*c*, 4*b* respectively designed to develop latent images corresponding to yellow, magenta, cyan, and black as primary colors.

The above controls are centrally implemented by a Central Processing Unit (CPU) 25. The CPU 25 may be comprised of a Digital Signal Processor (DSP), and an Application Specific Integrated Circuit (ASIC).

The CPU 25, in addition to the above, controls operations of a lamp driving circuit 26, an operation panel controlling circuit 27, a main charger controlling section 28, a developing bias controlling section 29, a transfer high-voltage controlling section 30, a sheet transport controlling section 31, and a motor/clutch controlling section 32.

The copier 100 has a function of being connectable with a known network, and is provided with a network interface card (NIC) 33 (restriction contents acquiring means) for transmitting the image data stored in the bit map memory 19 to an external device and receiving the same from the external device.

As shown in FIG. 2, the NIC 33 is connected with a document management server 34 via a network 200, and is also connected with other copiers via the document management server 34.

The local area network (LAN) having the above configuration is connected with an information management center 36 (external device) via a LAN server 35 and an extensive (wide-area) network 201. In this embodiment, the extensive network 201 is a public telephone line or a dedicated line. The extensive network 201 may include communications line such as metallic wire, light, and radio.

The CPU 25 is connected with a conferring dictionary 5, an ID storage section 6, a restriction information storage section 7, a Global Positioning System (GPS) 8 which corresponds to current position acquiring means of this invention, and a program storage section 9 in such a manner that data are communicable between the CPU 25 and the respective sections. The conferring dictionary 5 stores specific information such as particular images and particular texts. The ID storage section 6 pre-stores identification information which makes all the possible operators identifiable. The restriction information storage section 7 stores restriction contents in association with the specific information which differ from region to region. The GPS 8 acquires information regarding the position or site where the copier 100 is installed. The program storage section 9 stores programs and contents necessary for processing various information.

Next, described are the contents of the program to be implemented by the CPU 25 referring to FIG. 3. S1, S2, S3, . . . respectively denote the numbers of procedures (steps) to be implemented by the CPU 25. For instance, the CPU 25 functions as restriction process executing means by implementing a program to execute the steps in FIG. 3.

First, when power is supplied to the copier 100, the CPU 25 detects whether a copy button on an unillustrated operating section is pressed (step S1).

When it is detected that the copy button is pressed (YES in step S1), scanning by the CCD 1 is initiated (step S2), and image data read by the scanning is stored in the bit map memory 19. The CCD 11 reads out color information on yellow, magenta, cyan, and black. Image data in association with the respective color data of yellow, magenta, cyan, and black are stored in the bit map memory 19.

Among the color information on yellow, magenta, and cyan, the copier 100 handles the color information on yellow as visible information. This is because yellow is a least recognizable color to a human eye despite the fact that yellow carries certain visible information, and printing information of a negligibly small size in yellow at a corner of a sheet will not stand in a way of a person manipulating the copier 100.

Thus, the CCD 11 for reading color information on yellow constitutes an example of specific information reading means of this invention.

The CPU 25 performs a known image cutting operation (taking out a Y-coordinate data of an image expressed in Y-M-C-K coordinate system converted from the image expressed in R-G-B coordinate system; see Japanese Unexamined Patent Publication No. 10-334213 for more details) with respect to image data stored in the bit map memory 19, and carries out a known matching with specific information registered in the conferring dictionary 5. The conferring dictionary 5 stores, for example, barcode information. With this arrangement, the CPU 25 carries out matching as to whether color information on yellow read out by the CCD 11 matches the barcode information. If the judgment result is affirmative (YES in step S3), the CPU 25 goes to step S5. If it is judged that matching is not established (NO in step S3), the CPU 25 controls the various sections to perform general copying (step S4).

Subsequently, in step S5, the CPU 25 causes a monitor screen of the operating section or the like to display a screen image (message) of requesting an operator to enter identification information that makes the operator identifiable, such as "Enter your ID number". Various information are usable as identification information such as voice pattern information, fingerprint information, and IC cards, in addition to ID numbers. In this embodiment, described is a case where an ID number is used as identification information.

If the identification information (ID number of the operator) is entered within a predetermined time in response to the screen message in step S5 (YES in step S6), the CPU 25 compares the entered ID number with an ID number stored in the ID storage section 6, and judges whether the operator is identical to a user having the ID number stored in the ID storage section 6 (step S7).

The operating section through which the ID number is entered is an example of user information entering means of this invention. If it is judged that the entered ID number coincides with the ID number stored in the ID storage section 6 (YES in step S8), the CPU 25 accesses the restriction information storage section 7 to extract restriction information which has been stored in the restriction information storage section 7 in association with the specific information in terms of visible information on yellow (step S9). The restriction information is information which is defined in association with the specific information and which relates to processes following the step S9. The restriction information is comprised of command or data.

If it is judged that the restriction information is a command of banning copying (namely, the CPU 25 enters step S11 following step S9), then, the CPU 25 displays a message on the display section such as "Copying is prohibited", suspends operations that follow, and returns the routine to step S1. In this case, the restriction information may include copying restriction information which differs depending on the authorized level of the operator. Specifically, copying of all or part of the documents may be banned depending on the authorized level of the operator. For instance, there is a case that restriction contents differ from region to region with respect to an individual user, for example, depending on a situation whether the user is a local government worker or a company staff. A manner as to how to handle the situation where the restriction contents differ depending on a region or the like will be described later. Unauthorized information disclosure is restricted or banned by taking a certain measure, thus improving security of a corporation or its equivalent.

In the case where it is judged that the restriction information is information relating to copyright (step S13), a process is executed to comply with the copyright information (step S14). For instance, if the restriction information includes information relating to the cost required to copy a copyrighted document, copying is allowed when it is verified that an operator put money into a charging box installed on the copier 100. If the restriction information includes information regarding requirements under which further copying is allowed, such further copying is executable when an operator satisfies the requirements. For instance, if the restriction information includes information indicating the number of times the further copying is allowable, copying of the same document beyond the allowed number of times is banned, and a similar process as step S11 is executed. In this case, it is desirable to print the information indicating the allowable number of times of copying at an appropriate position on a sheet or sheets of a copy obtained by copying a copyrighted document with yellow toner. The printed information is read at a time when need arises to make a further copy. The information on the allowable number of times of copying is printed on a sheet or sheets of a copy with the allowable number of times being decremented by one each time a copy is made. At the time when it is detected that the printed number of times becomes zero, no further copying is allowed (steps S11, S12).

The allowable number of times of copying may differ depending on a region or organization (for example, based on a judgment as to whether the organization is a research institute of a university or an organization in general public). Copyright law differs from country to country, and there is a case that staffs of a municipal corporation use the copier. In view of these different situations, the restriction contents are differentiated one from another depending on a region, which will be described later.

In the case where a document is a copyrighted document, it is desirable to discriminate whether the document is an original document or a copy immediately. To meet this demand, it is preferable to print information indicating that a document is a copy with yellow toner and to allow the document to be readable as such when the document is brought to a post-process. The restriction contents regarding a copyrighted document also differ depending on a region, country, etc.

In the case where the restriction information includes information other than the above, a certain process is executed to comply with the other information (steps S16, S17). For instance, the process to comply with the other information may include printing the number of times of copying that target information has been copied or information regarding a history on the copying on a sheet or sheets. The restriction contents concerning the process may differ from region to region.

Examples of manners of setting the allowable number of times of copying an original document are described referring to FIGS. 6A and 6B. In principle, there are two different manners of making a copy from an original document. One way is such that an original document is copied ($1^{st}$ stage copying), a copied document is copied again ($2^{nd}$ stage copying), and recopied document is further copied ($3^{rd}$ stage copying) in a stage-wise manner as shown in FIG. 6A. The other way is, as shown in FIG. 6B, such that a certain number of copies are produced simultaneously from an original document. Control in which an operator is banned from copying an original document beyond the allowable number of times in series as shown in step S14 is to monitor to which stage the copying has been proceeded, as shown FIG. 6A. In the example of FIG. 6A, shown is a case that the allowable number of stagewise copying is three. In other words, in FIG. 6A, a fourth-time ($4^{th}$ stage copying) or further copying of an original document is banned. Moreover, information regarding the number of copies of an original document (see FIG. 6B) may be transmitted to the information management center 36 so that the information management center 36 can grasp the total number of copies of the original document.

By installing a copier capable of managing or restricting the allowable number stage-wise number of copying (FIG. 6A) or the number of copies (FIG. 6B) of an original document on a worldwide-basis makes it possible to control the total number of copies of confidential documents in, for example, an internationally operating company having branch offices or subsidiaries over the world. It is the matter of course that it is a crucial requirement to establish a management system in such a company in which unauthorized employees are prohibited from taking out an original document or its copy outside the company and an authorization of a person who is making a copy from the original document (or any subsequent copied document) is strictly checked on the basis of identification information to implement this idea.

The above arrangement makes it possible to strictly control handling of confidential documents by, for example, allowing the number of stage-wise copying of an original document to be only one time according to FIG. 6A, and by setting the allowable number of copies according to FIG. 6B equal to the number of the branch offices of a company. By doing so, the head office can keep the original of the confidential document, and the branch offices are allowed to keep only one copy each, which is directly duplicated from the original. In other words, personnel of the branch office cannot make a further copy from the one they received from the head office.

The aforementioned restriction and management on the total number of copies may be applicable to a system in which strictly restricted or banned is copying of documents relating to privacy such as resident cards or documents relating to national secrets (namely, documents requiring high level in security) beyond a necessary number of times of copying.

The conferring dictionary 5, the ID storage section 6, and the restriction information storage section 7 may be provided in the information management center 36 which is accessible from the CPU 25 via the NIC 33, the network 200, and the extensive network 201.

In the above altered arrangement, upon completion of scanning in step S2, the CPU 25 accesses the information management center 36 via the NIC 33 corresponding to the restriction contents acquiring means of this invention, and makes a judgment as to whether the image data obtained by the scanning and the specific information stored in the conferring dictionary 5 in the information management center 36 matches each other (step S3).

Thereafter, in step S7, the CPU 25 makes a judgment as to whether the ID number entered through the operating section matches the ID number stored in the ID storage section 6 in the information management center 36.

Next, in step S9, the restriction information in correspondence with the specific information is extracted from the restriction information storage section 7 in the information management center 36.

Subsequently, in step S14 where a process is executed to comply with the copyright information, the following process is implemented. Specifically, in the case where it is detected that the restriction information includes information relating to the allowable number of times of copying, and copying is implemented a certain number of times, the information relating to the allowable number of times is updated by reducing the certain number of times of copying from the allowable number of times of copying stored in the restriction information storage section 7 in the information management center 36, and the updated information is stored in the restriction information storage section 7.

Alternatively, in the case where the copyright information includes information relating to charging regulations such as the cost on copying a copyrighted document, as mentioned above, the information management center 36 implements an operation of automatically charging the copy cost to the account stored in association with the user ID number. Information relating to the cost per copy may differ from region to region.

If the process in step S14 or S17 is ended irrespective of a condition that the data management is implemented by the copier 100 or by the storage means in the network, the CPU 25 stores the ID number of the operator along with the processed contents in the ID storage section 6 (step S15). Thus, managed is who accessed the document management server 34 and to what information he or she accessed.

The contents on the aforementioned restriction information differ from region to region. For instance, there is a case that technical documents, texts used in universities and the like which are to be protected under the copyright law of the developed countries are copied without restriction in the developing countries or regions. Further, taking an example in Japan, required restriction level on copyrighted documents differs between individual use in general public and a nonprofit purpose of use as seen in educational institutions such as universities (see the Copyright Law in Japan, Article 33). In view of this, it is convenient to rewrite the restriction information stored in the restriction information storage section 7 appropriately, i.e., to update the information depending on the site where the copier 100 is installed (namely, to update the information).

Further, since the language differs from region to region, it will be very convenient to provide an arrangement that a language program for information processing is ready to be acquired depending on the site (region) where the copier 100 is installed.

In view of the above demand, in the case where the installed site of the copier 100 is changed or a like situation occurs, the CPU 25 executes a program for updating the restriction information and the like, acquires restriction information and a language program depending on the installed site, and allows the restriction information and the language program to be stored in the restriction information storage section 7 and in the program storage section 9, respectively in response to a command of updating the restriction information and the language program from an operator through the operating section.

FIG. 4 is a flowchart illustrating a process as to how the CPU 25 updates the restriction information and the language program. The CPU 25 functions as process contents updating means by implementing a program for executing the steps shown in FIG. 4.

The process of updating the restriction information and the language program shown in FIG. 4 is executed when needs arises to do so. For instance, the updating process may be executed when the CPU 25 receives an update command from an operator or a serviceperson through the operating section indicating that the copier is newly installed or transferred to another location. It may be preferable to perform the process of updating the restriction information and the language program periodically or at an initial stage of a series of copying operations to keep up with modification or revision of the restriction information in order to cope with modification or revision of laws and regulations (e.g. revision of the copyright law).

In the flowchart shown in FIG. 4, first, when the CPU 25 receives input of a certain key or the like through the operating section, the CPU 25 downloads information relating to a current location of the copier 100 which is detected by the GPS 8 (step S20).

Then, the CPU 8 accesses the information management center 36 via the NIC 33 (restriction contents acquiring means), the LAN server 35, etc. (step S21), downloads the restriction information which has been stored in a database (not shown) in the information management center 36 in correspondence with information relating to a region (step S22), and writes the downloaded restriction information in the restriction information storage section 9 for updating the contents on the restriction information (step S23). Then, the predetermined restriction processes in step S13, S14, S16, S17 shown in FIG. 3 are executed based on the updated restriction information.

Subsequently, the CPU 25 accesses the information management center 36 or a database (not shown) of other application/provider via the NIC 33 to download a program in correspondence with the current position information which is acquired by the GPS 8 (step S24), and writes the program in the program storage section 9 for updating the storage contents in the program storage section 9. In this case, the information management center 36 serves as the application/provider.

Examples of programs to be updated include, in addition to the aforementioned language program, an OCR program, a program of computing tax, a program relating to charging regulations, and programs for implementing various restriction processes, which differ from country to country or from region to region.

Further, downloading contents such as various charging data and executing the restriction processes based on the downloaded contents also fall in the scope of this invention.

The above embodiment has been described based on the idea that visible information (information in yellow) is printed at an appropriate position on a sheet. Alternatively, invisible information unrecognizable by a human eye may be included. The altered arrangement is advantageous in that invisible information is printable at any position on a sheet because the invisible information is sensitive to a specific wavelength and is recognizable even in a state that the invisible information is overlapped with an image in yellow, magenta, cyan, or black.

Figure 5:
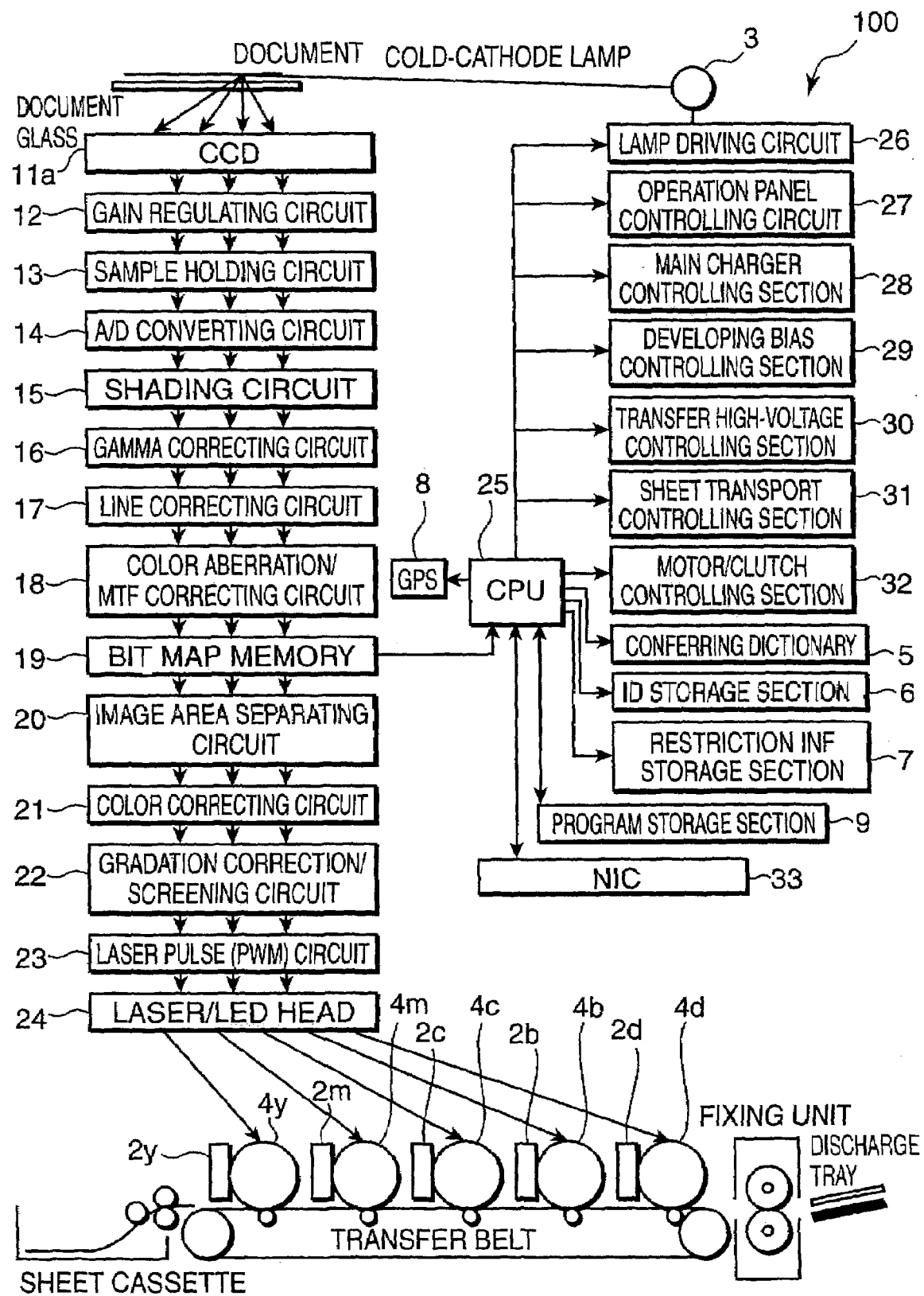
FIG. 5 is a conceptual diagram of an entirety of a copier in accordance with another embodiment of this invention.

FIG. 5 is a conceptual diagram showing an entire arrangement of a copier 100 capable of printing invisible information, as a second embodiment of this invention. The copier 100 shown in FIG. 5 includes a CCD 11a, a photosensitive member 4d, and a fifth developing section 2d. The CCD 11a reads invisible information 51 having sensitivity to a specific wavelength, in addition to visible information. The photosensitive member 4d forms an electrostatic latent image in invisible color toner on the surface thereof. The fifth developing section 2d charges the invisible toner on the photosensitive member 4d to apply the invisible toner onto the latent image formed on the surface of the photosensitive member 4d. In this case, the CCD 11a is an example of the specific information reading means of this invention. The CCD 11a may be comprised of a CCD exclusively used for reading visible information, and a CCD exclusively used for reading invisible information.

A manner of processing invisible information in the second embodiment is substantially the same as in the first embodiment except that invisible information is used in the second embodiment whereas visible information (information in yellow) is used in the first embodiment. Accordingly, description on the processing manner of invisible information will be avoided in this section.

The second embodiment of using invisible information is also applicable to a copying machine of copying a monochromatic image, in addition to a color copying machine.

Further, whereas restriction information and programs are acquired through a network in the foregoing embodiments, it is possible to provide a database storing restriction information and programs on the side of the copier 100 and to extract the restriction contents from the database. In such an alteration, the database corresponds to the restriction contents acquiring means of this invention.

As described above, preferably, the restriction information which differs depending on a region may include information relating to charging regulations such as information relating to the cost per copy of a document which differs from region to region.

This invention is applicable to an arrangement in which regions have been analyzed and classified into detailed areas. For instance, restrictions relating to copyright may differ in an area (institution) such as libraries and schools from those in the other areas. If a location detected by the GPS 8 is a school or a library, it is required to alter the charging conditions including the copy cost. This invention can handle such a situation. Further, there is a case that restriction contents differ in terms of various units such as business office, branch office, affiliated company or the like even in one company or a municipal corporation. In view of this, it may be possible to vary the restriction contents by judging to which business unit the target site is categorized based on position data of the copier detected by the GPS 8 of the copier. The target site is a place where the inventive copier is installed.

This invention is applicable to image forming apparatuses such as facsimile machines and printers, as well as to the aforementioned copier.

To sum up this invention, according to an aspect of this invention, an image forming apparatus equipped with restriction process executing means for executing a predetermined restriction process in compliance with acquired restriction information has current position acquiring means for acquiring current position information indicating a current location of the apparatus; restriction contents acquiring means for acquiring restriction contents which differ depending on a region; and process contents updating means for acquiring the restriction contents at the current location of the apparatus by the restriction contents acquiring means based on the current position information acquired by the current position acquiring means and for updating the restriction information in the image forming apparatus.

With the above arrangement, the apparatus can timely cope with a variety of restrictions which differ depending on the site where the apparatus is installed, no matter where the apparatus may be shipped. Thus, there is no need of storing restriction information in correspondence with a region where the apparatus is to be used prior to its shipment. Furthermore, according to the aspect of this invention, there is no need of replacing an ROM storing restriction contents with a new one storing updated contents even if the restriction contents are changed owning to different kinds of reasons. Thus, the apparatus can cope with the change of restriction contents with ease.

Preferably, the restriction contents acquiring means may acquire the restriction contents, which differ depending on the region via a network. According to this arrangement, the restriction contents in the apparatuses installed over the world can be changed all at once by merely changing the restriction information in a single database on the network. This is effective in saving labor and time.

Preferably, the restriction contents acquiring means may include storage means for storing the restriction contents which differ depending on the region, and may acquire the restriction contents which differ depending on the region by reading the restriction contents from the storage means. According to this arrangement, the restriction contents can be easily updated without changing a gigantic information infrastructure such as a network.

According to another aspect of this invention, the apparatus further comprises means connectable with an application/provider, and the restriction contents extracted by the restriction contents acquiring means are executed by utilizing a program or contents downloaded from the application/provider.

The language for allowing operators or uses to comprehend the restriction contents differs depending on a country or nation. According to the above aspect of this invention, since the language program which differs depending on the country or nation is easily acquired, the apparatus can timely cope with information such as information relating to charging regulations which may differ from region to region. This arrangement provides high responsiveness in dealing with restriction contents.

In the case where the restriction contents include information concerning the allowable number of times of copying, and it is judged that the allowable number of times of copying after a current copying is one or more, the restriction process by the restriction process executing means may include printing the allowable number of times of copying on a sheet as visible or invisible information. According to this arrangement, profit of a copyright holder is secured even in a condition that copying of a copyrighted document is repeated.

According to yet another aspect of this invention, the apparatus further comprises specific information reading means for reading an image attached with the visible or invisible information, and the restriction information is acquired by the specific information reading means. For instance, in the case where the read restriction information is information relating to charging regulations, information relating to the cost per copy can be extracted from the restriction information obtained from a Global Positioning System (GPS) considering the fact that the cost per copy in the charging regulations may differ depending on the region.

According to still another aspect of this invention, the process executed by the restriction process executing means includes payment-based copying in compliance with charging information in the case where the restriction contents acquired by the restriction contents acquiring means includes the charging information which is defined depending on the region.

According to the above arrangement, if the charging data such as the cost per copy is locally changed, the change of the cost is immediately applied throughout the region. This is effective in saving time and labor.

This application is based on Japanese patent application serial no. 2002-058336 filed in Japan Patent Office on Mar. 5, 2002, the contents of which are hereby incorporated by reference.

Although the present invention has been fully described by way of examples with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image forming apparatus comprising:
   restriction process executing means for executing a predetermined restriction process in compliance with acquired restriction information;
   current position acquiring means for acquiring current location information indicating a current location of the apparatus;
   restriction contents acquiring means for acquiring restriction contents which differ depending on a region; and
   process contents updating means for acquiring the restriction contents at the current location of the apparatus by said restriction contents acquiring means based on the current location information acquired by said current position acquiring means and for updating said restriction information in the image forming apparatus.

2. The image forming apparatus according to claim 1, wherein said restriction contents acquiring means acquires the restriction contents which differ depending on the region via a network.

3. The image forming apparatus according to claim 1, wherein said restriction contents acquiring means includes storage means for storing the restriction contents which differ depending on the region, and acquires the restriction contents which differ depending on the region by reading the restriction contents from said storage means.

4. The image forming apparatus according to claim 1, further comprising means connectable with an application/provider, and wherein the restriction contents extracted by said restriction contents acquiring means are executed by utilizing a program or contents downloaded from said application/provider.

5. The image forming apparatus according to claim 1, wherein the restriction contents acquired by said restriction contents acquiring means includes information concerning the allowable number of times of copying in the image forming apparatus, and if it is judged that the allowable number of times of copying in the image forming apparatus after a current copying is one or more, the restriction process by said restriction process executing means includes printing the allowable number of times of copying on a sheet as visible or invisible information.

6. The image forming apparatus according to claim 5, further comprising specific information reading means for reading an image attached with the visible or invisible information, and wherein said restriction information is acquired by said specific information reading means.

7. The image forming apparatus according to claim 1, wherein the process executed by said restriction process executing means includes payment-based copying in compliance with charging information if it is judged that the restriction contents acquired by said restriction contents acquiring means includes the charging information which is defined depending on the region.

* * * * *